Dec. 29, 1964  W. WITT ETAL  3,163,767
MEASURING APPARATUS
Filed Feb. 17, 1960  3 Sheets-Sheet 1
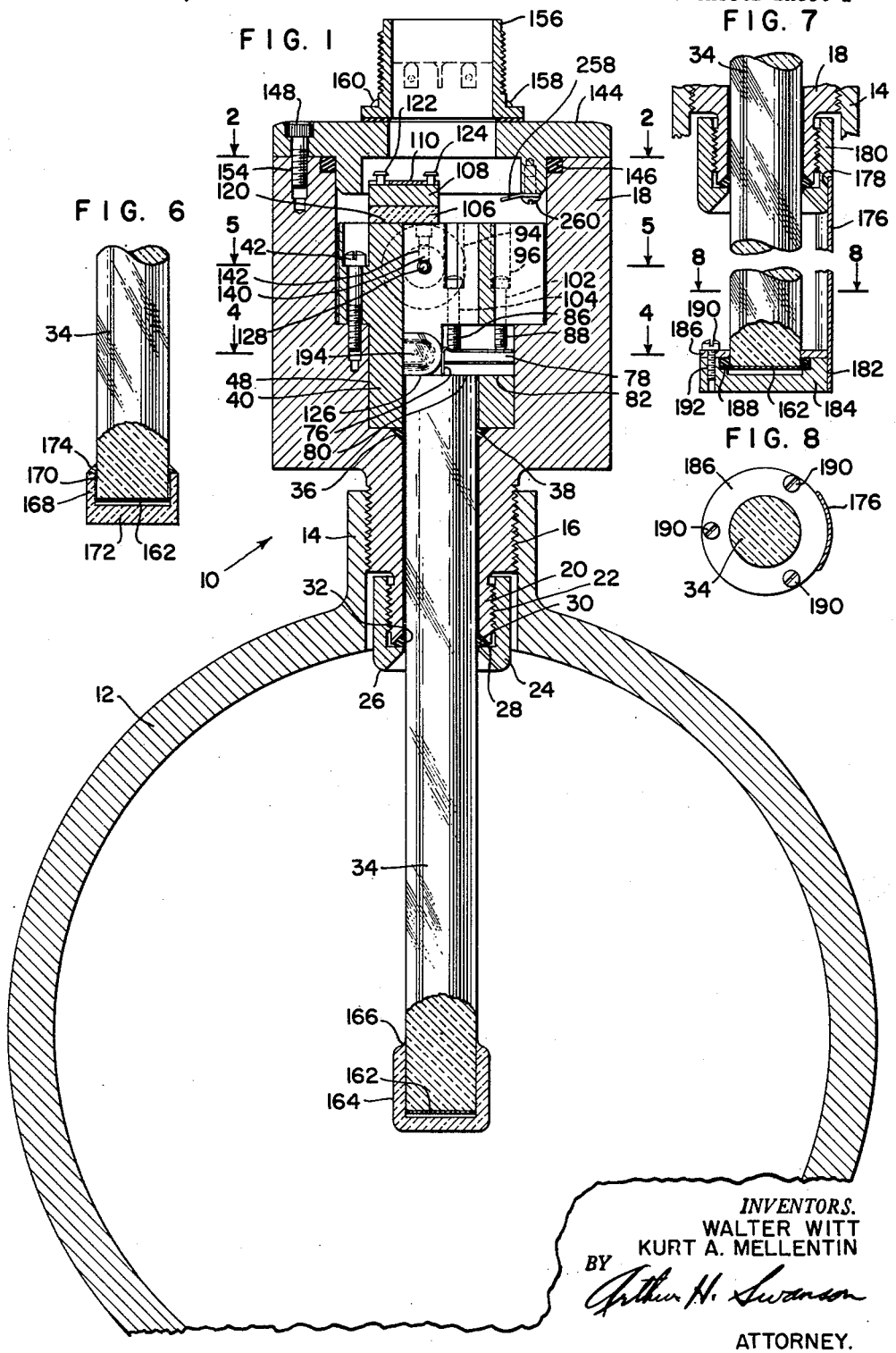
INVENTORS.
WALTER WITT
KURT A. MELLENTIN
BY Arthur H. Swanson
ATTORNEY.

Dec. 29, 1964   W. WITT ETAL   3,163,767
MEASURING APPARATUS
Filed Feb. 17, 1960   3 Sheets-Sheet 2
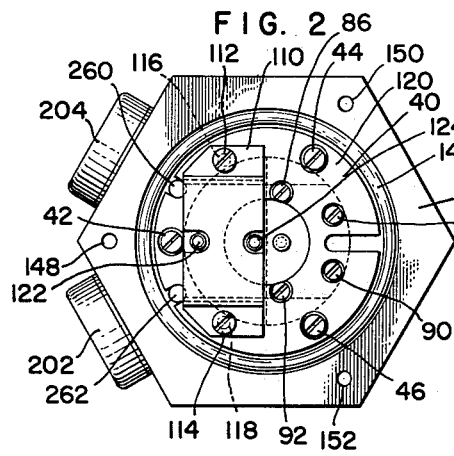
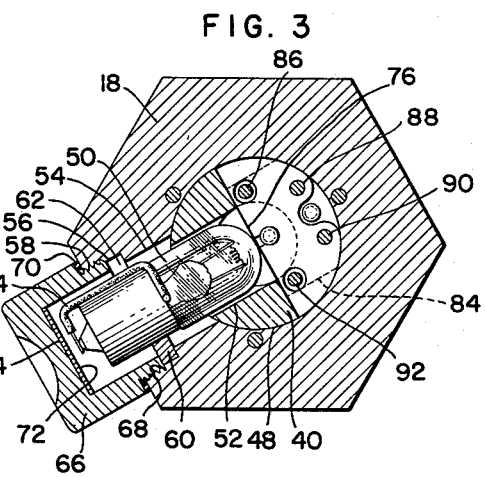
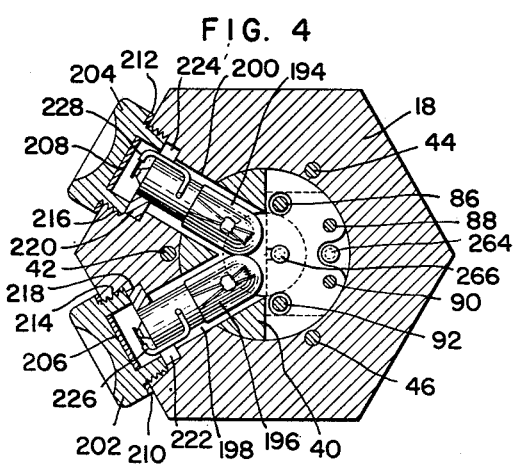
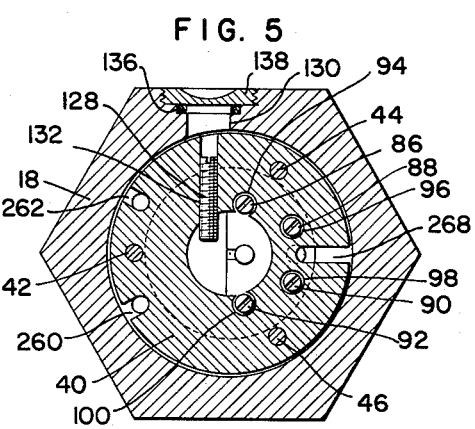
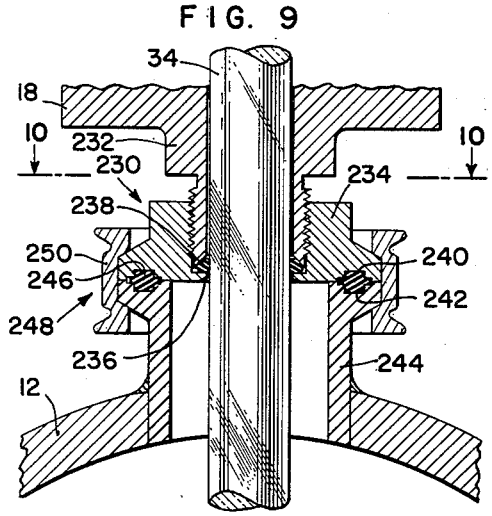
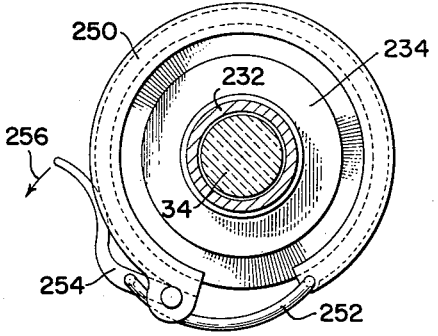
INVENTOR
WALTER WITT
KURT A. MELLENTIN
BY
ATTORNEY.

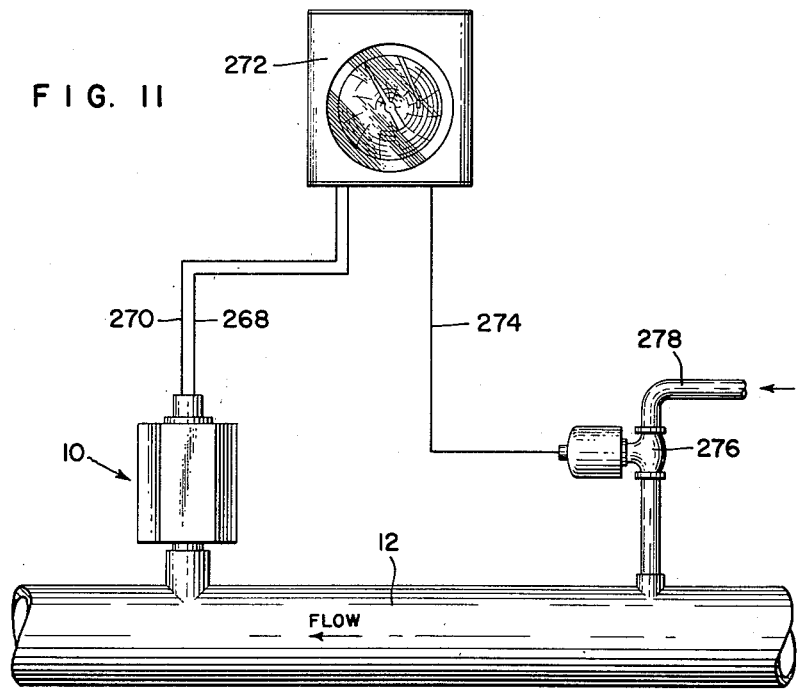

United States Patent Office 3,163,767
Patented Dec. 29, 1964

3,163,767
MEASURING APPARATUS
Walter Witt and Kurt A. Mellentin, Philadelphia, Pa., assignors to Honeywell Inc., a corporation of Delaware
Filed Feb. 17, 1960, Ser. No. 9,260
15 Claims. (Cl. 250—218)

A general object of the present invention is to provide a high speed density sensing apparatus for continuously measuring the density of any one of a number of different types of hot, warm or cold fluids passing through a flow line such as any number of a variety of baby foods, tomato juices and allied products, as well as sweet liquids such as honey and allied sugar solutions.

This density sensing apparatus is particularly useful in a process in which a carbohydrate such as sugar is being produced from sugar cane or sugar beet. In our present-day sugar refineries which are used to carry out this process it is necessary to maintain the degree Brix, or in other words the percentage by weight of sucrose, $C_{12}H_{22}O_{11}$, in the solution, at various points in the process within predetermined prescribed limits. The measuring apparatus disclosed herein is particularly adapted for use in measuring this sugar concentration that is present in hot sugar solutions but it should be understood that this apparatus may also be used to equal advantage to measure cold or warm solutions. To accomplish this task it has been the present-day practice to sample the specific gravity of this solution at frequent intervals of time by manually inserting a commercially available hydrometer into a flow line through which the sugar solution is flowing. After observing each of these hydrometer readings these readings must then be compared with numbers on a chart to convert them into the degree Brix reading desired or the scale of the hydrometer changed to indicate a Brix reading thereon.

To take a Brix reading an operator is first required to place the hydrometer in the sugar solution then draw what he considers to be a representative sample into the hydrometer and finally wait until the floating bulb of the hydrometer comes to a definite level in this sampled solution before taking such a Brix reading.

In order to have a closer control over the sugar solution passing through a refinery it would thus be very desirable to have an instrument that would more directly and continuously measure the condition of the sugar solution in degree Brix than has heretofore been provided with the slow reading hydrometer technique described supra.

It is therefore another object of the present invention to provide a single transparent radiant energy transmitting probe member which when inserted into a flow conduit through which a hot, warm or cold sugar solution is passing will be able to provide a direct means of continuously detecting any changes which occur in the degree Brix of this solution.

It is also another object of the present invention to provide a probe member of the aforementioned type which forms a part of a flow control apparatus and that will automatically maintain the degree Brix, or percent by weight thereof of sucrose in a solution, at a constant value by altering the amount of water that is permitted to flow through a single conduit into this flowing solution.

Another more specific object of the invention is to provide a single probe of the aforementioned type which employs an incandescent light source to transmit radiant energy into one portion of a first end of the probe, a mirror to reflect the remaining portion of this energy from the other end of the probe and a radiant energy detector to sense the amount of radiant energy that remains after this radiant energy has thereafter been reflected out of the first end of the probe.

In the drawing:
FIGURE 1 of the drawing shows one embodiment of the present invention in which the probe shown therein may be taken as being protruding into either a vertical or a horizontally positioned flow line;
FIGURE 2 is a sectional view taken along lines 2—2 of FIGURE 1 with the cover plate removed;
FIGURE 3 is a sectional view similar to FIGURE 4 showing a single light source form of the device which may be used in lieu of the double light source as shown in FIGURES 1 and 4;
FIGURE 4 is a sectional view taken along the lines 4—4 of FIGURE 1;
FIGURE 5 is a sectional view taken along the lines 5—5 of FIGURE 1;
FIGURE 6 shows a first modified form of guide cap which may be used in lieu of the guide cap shown in FIGURE 1;
FIGURE 7 shows still another modified form of the guide cap shown in FIGURE 1;
FIGURE 8 shows a cross section of the end cap support member taken along lines 8—8 of FIGURE 7;
FIGURE 9 shows a more sanitary form of the apparatus than that disclosed in FIGURE 1 which is particularly suited for use in dairy and food flow line processes;
FIGURE 10 shows a view taken along the lines 10—10 of FIGURE 9; and
FIGURE 11 shows the probe member forming a part of a control apparatus which is useful in maintaining a solution passing through a flow line at a constant density or degree Brix.

One form of the aforementioned referred to probe type radiant energy transmitting and detecting means is readily identified as reference numeral 10 in FIGURE 1 of the drawing. A section of a flow conduit 12 is also shown in FIGURE 1 having an embossed sleeve portion 14 to which a cylindrical portion 16 of a hexagonal-shaped probe housing 18 is threadedly engaged. A circular ring portion 20 of this probe housing 18 having a smaller outside diameter than the housing portion 16 is shown threadedly connected at 22 with a nut 24. An inner ring portion 26 of this nut 24 is of a J-shaped configuration and is in pressing engagement with an O-ring seal 28. The upper portion of this seal 28 is shown in surface-to-surface engagement with another surface forming a countersunk portion 30 in the end of the circular ring portion 20. The entire inner diametral surface of the seal 28 is shown in pressing contact at 32 with a radiant energy transmitting cylindrical guide 34.

The guide 34 is preferably made of transparent material such as sapphire or Pyrex. However it should be understood that guides which are made of quartz, synthetic sapphire or of acrylin resin or methyl methacrylate plastic materials of the thermo-plastic type such as commercial Plexiglas or Lucite may be used depending on the temperature of the aforementioned flowing fluid.

This guide 34 is further shown projecting through and spaced from the circular ring portion 20, cylindrical portion 16 and hexagonal housing 18. A countersunk cylindrical surface 36 is shown forming an inner wall surface of the housing 18.

A second O-ring 38 is shown held in contact with the countersunk surface 36 by means of a cylindrical rod retaining member 40 which is in turn retained in position as shown in FIGURES 1 and 2 by means of identical screw connecting members 42, 44, 46. The outer periphery of member 40 is shown in loose fit relationship with the wall surface 48 which forms a cavity inside the housing 18.

It should be noted at this point that FIGURE 1 of the drawing shows that the compression of the seals 28 and 38 against the guide 34 provides the sole means by which the guide 34 is supported in the housing 18.

FIGURE 3 shows an incandescent light source in the form of a single electric light bulb 50. This bulb is shown in FIGURE 3 as protruding through a cylindrically bored-out portion of the member 40 formed by the wall portion 52 and the cylindrical cavity formed by the wall portions 54, 56, and 58. Seated within the wall portion 56 is a metal ring 60 integral with the base of the light bulb 50 and having a slot therein formed by a wall portion 62 in its outer peripheral surface to accommodate light conductors 64.

A light bulb protective casing 66, having a screw thread connection at 68, is threadedly connected to the surface 58 of the housing 18. This light bulb protective casing 66 is shown in a tightened threaded position against a gasket 70 so as to make an air-tight chamber in which the light bulb 50 is located. An insulator disc 72 is shown retained within the left end of a cylindrical cavity 74 formed in the casing 66 to isolate the electrical conductors of bulb 50 from being brought into contact with this casing 66.

Directly in front of the upper end of the light bulb 50 there is shown a substantially L-shaped light shield 76 which is made of a suitable opaque material. This shield 76 is shown completely surrounding the top and side portions of a light sensitive material such as a solar cell 78 as is shown in FIGURE 1.

To retain the solar cell 78 in fixed surface-to-surface engagement with the end portion 80 of the guide 34 and wall surface 82, of the substantially U-shaped slotted-out portion 84 in rod retaining member 40, there is shown four screw connections 86, 88, 90, and 92. Each of these screw connections are as shown in FIGURES 1 and 5 inserted in an associated cylindrical slot 94, 96, 98, or 100 and shown threadedly associated with for example the portion 102 and 104 of the cylindrical rod retaining member 40.

The lower portion of two of these screw connections 86 and 88 are shown in contact with the L-shaped light shield 76 to retain the solar cell that is immediately under this shield in the aforementioned fixed surface-to-surface engagement with the end portion 80 of the guide and surface 82 of member 40.

FIGURE 1 also shows a glass filter 106 and a reference solar cell 108.

The filter 106 can be of any type which is capable of transmitting radiant energy to the reference solar cell 108 which would be the same spectral distribution as that transmitted to the detector 78 by way of the guide 34 per se from the radiant energy source 50.

A clamping bracket 110 is shown in FIGURES 1 and 2 completely surrounding the side and left end portion of this filter 106 and the solar cell 108. Screws 112 and 114 threadedly connected at 116 and 118 are shown retaining the left end portion of this bracket in pressing engagement with the solar cell 108 and the filter 106 positioned thereunder which is in contact with a wall surface 120 of the member 40. The top of this clamping bracket 110 is provided with two terminal connections 122, 124.

The incandescent light source 50 has its filament positioned as shown in FIGURES 1 and 3 so that its radiant energy will be transmitted into the guide 34 through the end surface 126 in one general direction while it is simultaneously shown arranged to transmit radiant energy through the filter 106 to the reference solar cell 108. To provide a means of adjusting the amount of radiant energy that can be directed in the aforementioned manner onto the reference solar cell 108 there is shown in FIGURES 1 and 5 a threaded pin 128. This threaded pin 128 is inserted through an aperture formed by a cylindrical multi-shouldered wall portion 130 of the probe housing 18 and is further shown threadedly engaged with a tapped wall portion 132 at any desirable selected light restricting position. The further the inner end of the threaded pin 128 is moved into the aperture formed by the tapped wall portion 132 the less will be the quantity of light that can then be transmitted from the radiant energy light source 50 to the reference solar cell 108 and vice versa. The multi-shouldered wall portion 130 is shown having an O-ring seal 136 and a removable threaded cap member 138 pressing against this seal to maintain the interior of the casing 18 air-tight at this point.

FIGURE 1 also shows a locking screw 140 that is threadedly mounted in the tapped threaded portion 142 for retaining the radiant energy restricting screw in a suitable selected position.

The detecting member 10 is also provided as shown in FIGURES 1 and 2 with a hexagonal cover 144 which presses down on an O-ring seal 146 that is retained as shown in the upper surface of the casing 18 by means of the cover retaining bolts 148, 150, and 152. Each of these bolts 148, 150, and 152 are threaded into a tapped hole as shown e.g. at 154 for the bolt 148 in FIGURE 1.

A commercially available multi-prong threaded electrical AN connection 156 is shown held by means of a suitable number of bolts for example the bolts 158, 160 to the hex cover 144.

The extreme end of the rod 34 in FIGURE 1 which protrudes into the flow conduit 12 is shown having an aluminum vacuum coating 162. A cap 164 is also shown in FIGURE 1 spaced from this end and forming a protective covering for aforementioned coating 162 which cap is made of Pyrex or synthetic sapphire. The upper end of this cap is fused along its peripheral surface 166 to the outer periphery of the guide 34.

Although FIGURE 1 of the drawing disclosed one embodiment of the invention it should be understood that other alternative forms of end portions can be used to protect the aluminum vacuum coating at 162 on the end of the guide other than the fused cap arrangement shown in FIGURE 1.

One such other alternative end portion is shown in FIGURE 6 and consists of coating an outer peripheral ring portion 168 of the outer periphery of the guide 34 and the inner peripheral surface 170 of the cap 172 with silver paint. After firing each of these silver painted areas these parts are then joined together as shown and the cap is soldered between ring portion 168 and surface 170 as shown at 174 to the guide 34 about its entire peripheral upper edge. This firing and soldering arrangement is such that it will protect the mirror surface 162 from being exposed to the fluid that is surrounding the guide 34. In this manner the thin mirror surface at the end of the rod is not subject to damage as the cap 172 forms an air tight chamber.

Another alternative cap arrangement for the guide 34 is shown in FIGURES 7 and 8. In this arrangement the upper end of a curved flow line particle deflecting shield 176 is inserted into a vertical slot 178 in nut 180 and fixedly attached by welding its upper end in this position to nut 180. Other than the addition of a slot, the nut 180 is identical to the nut 24 shown in FIGURE 1 of the drawing. The lower end of the particle deflecting shield 176 is also shown inserted into a vertical slot 182 in cap member 184 and fixedly connected by welding its lower end in this position to the cap member 184. It can be seen that the shield will prevent any abrasive particles which may be present in the fluid that is traveling in the direction of the arrow in a flow line from being impinged against the outer surface of the guide 34. It can also be seen that the damage to the outer surface of the radiant energy transmitting guide would destroy the transmitting characteristics of this guide can thus be prevented by using such a deflecting shield 176. A retaining ring 186 is also shown pressing down on an O-ring 188 to make an air-tight seal at the end of the guide 34. The retaining ring is shown held in surface-to-surface contact with the cap 184 by means of a suitable number of connecting means such as the screws 190 threadedly engaged at 192 with this cap.

FIGURE 4 shows another form of the invention having two incandescent light sources 194, 196 in lieu of the one radiant energy light source 50 as shown in FIGURE 3 of the drawing. In this FIGURE 4 modified form of the invention the total candle power of these two light sources 194 and 196 selected can be made equal to the single incandescent light source 50 shown in FIGURE 3. The other difference is that two cylindrical bored-out holes 198, 200 are shown passing through the housing 18 and rod retaining member 40 to accommodate these two radiant energy light sources rather than the single aperture as shown in FIGURE 3.

Caps 202, 204 are each provided with insulators 206, 208 and gaskets 210 and 212 and are respectively threadedly connected at 214 and 216 to the casing 18. The ring 218 and 220 are shown integral with the base of each of their respective light bulbs 194, 196. Each of these rings 218, 220 have slots formed by the wall portion 222, 224 in its outer peripheral surface to accommodate their associated light conductors 226, 228.

FIGURE 9 shows a view similar to that shown in FIGURE 1 but making use of a rapid, hand tool release sanitary fitting identified as reference numeral 230 which will meet the rigid sanitary requirements of the milk and food and other similar fluid processing industries in general.

This fitting 230 makes use of a housing member 232 which, but for the omission of the threads at 16, is identical to the housing 18 shown in FIGURE 1 of the drawing. This housing member 232 is shown threadedly mounted in a cylindrical disc member 234 which may, for sanitary reasons, be made of stainless steel. When this disc member 234 is threadedly mounted as shown on the housing 232 its lower cylindrical lip portion 236 will force the O-ring seal 238 into the deformed position shown against the probe 34.

The lower surface of this disc member 234 is shown having a circumferential slot 240 therein which is identical to the slot 242 on the upper peripheral surface of the embossed sleeve member 244. A gasket 246 is inserted into the space formed by the peripheral slotted-out portions 240 and 242 of the disc member 234 and sleeve member 244.

A stainless steel snap action spring toggle actuated clamping member 248 which may be of a commercially available type, for example, a clamp commonly referred to in the sanitary fitting trade as a Tri Clamp may be used in the manner shown in FIGURES 9 and 10. This clamping member 248 is shown as consisting of four parts namely, the conduit snap-on ring portion 250 having an extendable rod portion 252 that is bent substantially into the form of a rectangle and a forked toggle lever 254 having one end in engagement with an end of the ring portion 250 and pivotally mounted at this end on one end of the rod portion 252. The other end of this lever 254 is shown snapped into a locked position against the outside wall of the snap ring 250. To remove pressure of such a snap ring 250 on members 234 and 244 one need only insert pressure in the direction of the arrow 256. This action causes the pressure applied by ring 250 against the outer peripheral walls of the disc member 254 and sleeve member 244 to be released so that these latter-mentioned parts can be disconnected from one another.

In FIGURE 1 there is shown a lug 258 and screw connection 260 which may be employed for grounding one side of either the single light bulb disclosed in FIGURE 3 or each of the double light bulbs 194, 196 as shown in FIGURE 4.

FIGURES 2 and 5 show passageways 260, 262 which are provided as a means through which the electrical conductors, not shown, for the bulbs 194, 196 can be connected to a suitable power source by way of the AN connection 156.

FIGURE 4 shows two terminals 264, 266 for the solar cell 78. Suitable conductors, not shown, are used to connect these terminals 264, 266 by way of the passageway 268, shown in FIGURES 2 and 5, to the AN connection 156.

FIGURE 11 of the drawing shows two electrical conductors 268, 270 respectively connected by way of the AN connection 156, shown in FIGURE 1, to the solar cells 78, 108.

The transmitting wire 268 shown schematically in FIGURE 11 represents a conductor which has one of its ends connected to the terminals 264, 266 of solar cell 78 and the transmitting wire 270 represents a second conductor having one of its ends connected to the terminals 122, 124 of the reference solar cell 108. The other ends of these conductors 268, 270 are shown connected to a recording controller 272. This recording controller can be of the type whose operation is disclosed in detail in the James Vollmer and John A. Duke application, Serial No. 753,570, filed August 6, 1958.

This controller is arranged to send an electrical output signal by way of a transmitting wire 274 to an electrically or electro-pneumatically operated control valve schematically shown as reference numeral 276 which signal is proportional to the ratio of the two solar cell input signals. It can thus be seen that a control system is hereby disclosed which will cause the valve 276 to be moved toward an open position immediately upon the occurrence of an increase in degree Brix or sucrose concentration and water to flow from a source not shown through conduit 278 into the conduit 12. In this way the concentration of the flowing fluid passing through the conduit 12 will be maintained at a desired sucrose concentration. In a similar but opposite manner it can be seen that the valve 276 will be moved toward a closed position immediately upon the occurrence of a decrease in the degree Brix or sucrose concentration and a smaller amount of water to flow from a source, not shown, through conduit 278 into the conduit 12.

In the operation of the aforementioned apparatus an incandescent radiant energy source e.g. 50 and a radiant energy sensitive detector 78 in spaced apart relationship therewith are positioned adjacent one end of a cylindrically-shaped transparent radiant energy transmitting probe 34 and the mirror 162 is positioned on or juxta-positioned to the outer end portion of this probe. Radiant energy from this incandescent radiant energy source enters one hemicircular portion of one end of the probe 34 at various angles of incidence or at those angles, from a line drawn normal to the end of the probe, at which this radiant energy enters the probe.

The radiant energy after traversing a short distance within the probe impinges against the peripheral side wall of the hemicircular portion of the cylindrical probe. Some of the radiant energy strikes the outer peripheral side wall interface of the probe and solution at angles of incidence less than the critical angle are refracted out of the probe into the moving sugar solution that is flowing through the flow conduit. The remaining portion of the radiant energy strikes the outer peripheral side wall at angles of incidence which are greater than the aforementioned critical angle and hence remain within the probe and make many additional similar side wall internal reflections. When this internally reflected radiant energy reaches the other end of the probe it is reflected against a mirror surface 162 on this end of the probe. After striking this mirror surface end portion 162 this radiant energy is reflected against the peripheral side wall of the probe. The radiant energy which continues to strike the peripheral side wall interface at angles of incidences less than the critical angle existing between the flowing fluid and the probe will be refracted out of the probe into the flowing sugar solution. The remaining portion of this radiant energy strikes the outer peripheral side wall at angles of incidence which are greater than this critical angle and hence are reflected several times internally within the probe.

The radiant energy detector 78 located at the same end of the probe as the light source 50 is shown for example as a solar cell 78 which is positioned to receive the radiant energy that is transmitted through this end 80 of the probe.

As the density, degree Brix or percent by weight of the sucrose in the sugar solution changes the index of refraction of this solution will change. This change will in turn simultaneously cause the aforementioned critical angle that exists between the sugar solution and probe to be reduced or enlarged depending on whether the sugar concentration is becoming less or more dense. The less dense the sugar concentration becomes the greater will be the amount of the transmitted radiant energy sensed by the radiant energy detector and vice versa.

What is claimed is:

1. An apparatus for instantaneously and continuously measuring changes in radiant energy loss taking place at an interface between a flowing fluid and a transparent probe in contact therewith, comprising a means for adapting a conduit through which said fluid is flowing to reseive said probe, a radiant energy source positioned external to said conduit and immediately adjacent a portion of one end of said probe to transmit radiant energy at different angles which are greater, equal to or less than the critical angle existing between said fluid and said probe against one side wall portion of said probe, a mirror surface on the other end of said probe to reflect said radiant energy passing through said probe in a reverse direction at different angles which are greater than, equal to or less than the critical angle existing between said fluid and said probe against the side wall portion of said probe that has not been refracted into said flowing fluid, a radiant energy detecting means positioned immediately adjacent another portion of said first-mentioned end of said probe to measure that portion of said radiant energy that has not been refracted into said flowing fluid after it has been reflected from said mirror in said reverse direction by said internal reflections against the side wall of said probe.

2. The measuring apparatus as defined in claim 1 wherein an incandescent light source is employed as said radiant energy source and a solar cell is employed as said radiant energy detecting means.

3. The measuring apparatus as is defined in claim 1 wherein said apparatus is provided with a casing having a cylindrical aperture therein that is adapted to be threadedly connected to an embossed sleeve portion projecting from the outer wall of said conduit and forming an opening therein, said cylindrical aperture being of a slightly greater diameter than said probe to accommodate the positioning of said latter-mentioned member in spaced relation therein, sealing rings positioned in spaced apart relationship on peripheral portions of said probe and in contact with a wall portion of said casing forming said aperture therein and means operably connected with said casing to maintain said rings in a pressed condition between said probe and said casing and to enable said probe to be retained in a supported condition in said casing.

4. The measuring apparatus as is defined in claim 1 wherein said apparatus is provided with a casing having a cylindrical aperture therein, said casing having an outer cylindrical portion that is adapted to be threadedly connected to a cylindrical disc member having a lip portion on its internal diametral surface, said cylindrical aperture formed by said casing being of a slightly greater diameter than said probe to accommodate the positioning of said probe in spaced relation therein, a sealing ring positioned on a peripheral portion of said probe and in contact with said lip portion, said threaded connection between said casing and said disc member providing a means of adjustably maintaining said sealing ring in a pressed condition between said probe and one end of said casing, an aperture formed in the wall of said conduit, a cylindrical sleeve portion connected to and protruding from the wall portion of said conduit which forms said aperture, a seal between said cylindrical sleeve portion and said cylindrical disc and a clamping means operably connected to said cylindrical sleeve portion and said cylindrical disc to rapidly connect or release said cylindrical disc and said cylindrical sleeve portion.

5. The measuring apparatus as defined in claim 1 wherein an elongated curved shield is adapted to be positioned in said flow line in spaced relation with and adjacent to said probe to protect said radiant energy transmitting characteristics of said probe from being damaged by abrasive particles within said flowing fluid.

6. An apparatus for measuring changes taking place in degree Brix of a flowing solution passing through a conduit in terms of the radiant energy loss taking place at an interface between said solution and a transparent probe in contact therewith, comprising a means adapted to be fixedly disposed in said conduit to retain said probe in contact with said flowing solution, a radiant energy source positioned external to said conduit and immediately adjacent a portion of one end of said probe to transmit radiant energy at different angles which are greater, equal to or less than the critical angle existing between said solution and said probe through said end portion and against one side wall portion of said probe, a mirror surface on the other end of said probe to reflect said radiant energy passing through said probe in a reverse direction at different angles which are greater than, equal to or less than the critical angle existing between said fluid and said probe against the side wall portion of said probe that has not been refracted into said flowing solution, a radiant energy detecting means positioned immediately adjacent another portion of said first-mentioned end of said probe to measure that portion of said radiant energy that has not been refracted into said flowing solution after it has been reflected from said mirror in said reverse direction by said internal reflections against the side wall of said probe.

7. An apparatus for measuring changes taking place in degree Brix of a flowing sugar solution passing through a conduit in accordance with loss of radiant energy to said sugar solution, comprising a transparent probe adapted to be fixedly disposed in said conduit and in contact with said flowing sugar solution, a radiant energy source positioned external to said conduit and immediately adjacent a portion of one end of said probe to transmit radiant energy at different angles which are greater, equal to or less than the critical angle existing between said sugar solution and said probe through said end portion and against one side wall portion of said probe, a mirror surface on the other end of said probe to reflect said radiant energy passing through said probe in a reverse direction at different angles which are greater than, equal to or less than the critical angle existing between said fluid and said probe against the side wall portion of said probe that has not been refracted into said flowing sugar solution, a radiant energy detecting means positioned immediately adjacent another portion of said first-mentioned end of said probe to measure that portion of said radiant energy that has not been refracted into said flowing sugar solution after it has been reflected from said mirror in said reverse direction by said internal reflections against the side wall of said probe.

8. The apparatus as defined in claim 1 wherein said end surface of said probe having said mirror surface is covered by an air tight cap having an inner end wall spaced from said last-mentioned surface, a first cylindrical flexible ring in contact with the periphery of said probe adjacent said last-mentioned probe end, a rigid ring fixedly connected to a portion forming a cylindrical side wall of said cap to retain said first cylindrical flexible ring in a pressed condition between said probe and the internal wall of said side portions, an elongated curved shield spaced a small distance from an elongated peripheral portion of said probe, said shield being fixedly connected to said exterior of said side wall at one end and connected at its other end to a casing threadedy connected to a wall portion forming an opening in said conduit, a second cylindrical ring in contact with said casing and a peripheral portion of the probe adjacent to said casing and said first and second cylindrical ring connections forming supporting means for said probe.

9. An apparatus as defined in claim 1 wherein said end surface of said probe having said mirror surface is covered by an air tight pyrex cap having its inner end wall spaced from said last-mentioned surface, a first peripheral ring portion of a side portion of said cap and a second peripheral ring portion of said probe adjacent said first-mentioned ring surface each having a fired silver paint coating and joined to each other by solder, and said connection forming an air tight spaced about said mirror surface portion of said probe.

10. The apparatus as defined in claim 1 wherein said end surface of said probe having said mirror surface is covered by an air tight cap having an inner end wall spaced from said last-mentioned surface, the side wall portion of said cap being spaced from its associated peripheral surface of said probe, the extreme outer end of said side wall portion which is distant from said mirror surface being in fused relation with a peripheral portion of the probe that is adjacent therewith and said fused connection forming an air tight chamber about said mrrror surface.

11. An apparatus for instantaneously and continuously measuring changes in radiant energy loss at an interface between a hot flowing fluid and a transparent probe in contact therewith, comprising a means for adapting a conduit through which said fluid is flowing to receive said probe, a radiant energy source positioned external to said conduit and immediately adjacent a portion of one end of said probe to transmit radiant energy at different angle which are greater, equal to or less than the critical angle existing between said fluid and said probe against one side wall portion of said probe, a mirror surface on the other end of said probe to reflect said radiant energy passing through said probe in a reverse direction at different angles which are greater than, equal to or less than the critical angle existing between said fluid and said probe against the side wall portion of said probe that has not been refracted into said flowing fluid, a radiant energy detecting means positioned immediately adjacent another portion of said first-mentioned end of said probe to measure that portion of said radiant energy that has not been refracted into said flowing fluid after it has been reflected from said mirror in said reverse direction by said internal reflections against the side wall of said probe.

12. A probe, comprising a solid transparent rod, a reflective coating covering and in physical contact with one end of the rod, a cap encompassing the coated end of the rod and constructed to form a protective fluid-tight chamber immediately above the coated end, a radiant energy source positioned immediately adjacent the other end of said rod, a first radiant energy detecting means immediately adjacent said last-mentioned end of said rod and a reference radiant energy detecting means positioned immediately adjacent said radiant energy source for said first radiant energy detecting means.

13. A probe, comprising a solid transparent rod, a reflective coating covering and in physical contact with one end of the rod, a radiant energy source positioned immediately adjacent the other end of said rod, a first radiant energy detecting means immediately adjacent said last-mentioned end of said rod to continuously detect radiant energy emitted from said source that is reflected from said reflective coating and a reference radiant energy detecting means for the first radiant energy detecting means positioned immediately adjacent said radiant energy source that is operably arranged to continuously detect radiant energy having a similar spectral distribution as that being detected by said first-mentioned detecting means.

14. A probe, comprising a solid transparent rod, a reflective coating covering and in physical contact with one end of the rod, a radiant energy source having one side of a filament retained therein positioned immediately adjacent and in a parallel plane with a first portion of the other end of said rod to emit radiant energy therethrough, a first radiant energy detecting means immediately adjacent another portion of said last-mentioned end of said rod to detect the radiant energy emitted therefrom that has been reflected from the reflective coating, a second radiant energy detecting means positioned immediately adjacent another opposite side of and in a parallel plane with said filament to detect the radiant energy emitted therefrom and a control circuit operably connected said first and second detecting means to produce an electrical output control signal which is proportional to the ratio existing between the radiant energy detected by the first and second detecting means.

15. A probe, comprising a solid transparent rod, a reflective coating covering and in physical contact with one end of the rod, a radiant energy source positioned immediately adjacent the other end of said rod, a first radiant energy detecting means immediately adjacent said last-mentioned end of said rod to continuously detect radiant energy emitted from said source that is reflected from said reflective coating and a reference radiant energy detecting means for the first radiant energy detecting means juxta-positioned adjacent said radiant energy source that is operably arranged to continuously detect radiant energy having a similar spectral distribution as that being detected by said first-mentioned detecting means.

References Cited in the file of this patent
UNITED STATES PATENTS

| | | |
|---|---|---|
| 2,394,949 | Straat | Feb. 12, 1946 |
| 2,415,436 | Maris | Feb. 11, 1947 |
| 2,420,716 | Morton et al. | May 20, 1947 |
| 2,562,181 | Frommer | July 31, 1951 |
| 2,567,036 | Shannon | Sept. 4, 1951 |
| 2,569,127 | Eltenton | Sept. 25, 1951 |
| 2,680,446 | Bendler | June 8, 1954 |
| 2,748,790 | Hodgens | June 5, 1956 |
| 2,826,956 | Simmons | Mar. 18, 1958 |
| 2,838,683 | Munro | June 10, 1958 |
| 2,859,757 | Parsons | Nov. 11, 1958 |
| 2,885,922 | Miller | May 12, 1959 |
| 2,892,378 | Canada | June 30, 1959 |
| 2,964,640 | Wippler | Dec. 13, 1960 |
| 2,964,992 | Hurdle | Dec. 20, 1960 |
| 2,976,763 | McKeag | Mar. 28, 1961 |
| 3,068,697 | Carlson | Dec. 18, 1962 |